US007810090B2

(12) United States Patent
Gebhart (10) Patent No.: US 7,810,090 B2
(45) Date of Patent: Oct. 5, 2010

(54) GRID COMPUTE NODE SOFTWARE APPLICATION DEPLOYMENT

(75) Inventor: Alexander Gebhart, Ubstadt-Weiher (DE)

(73) Assignee: SAP AG, Walldorf (DE)

( * ) Notice: Subject to any disclaimer, the term of this patent is extended or adjusted under 35 U.S.C. 154(b) by 1069 days.

(21) Appl. No.: 10/740,160

(22) Filed: Dec. 17, 2003

(65) Prior Publication Data

US 2005/0138618 A1 Jun. 23, 2005

(51) Int. Cl.
*G06F 9/44* (2006.01)
*G06F 15/16* (2006.01)

(52) U.S. Cl. .................. 717/176; 709/202; 709/226; 718/104

(58) Field of Classification Search .................. 717/176
See application file for complete search history.

(56) References Cited

U.S. PATENT DOCUMENTS

| | | | |
|---|---|---|---|
| 5,276,789 A | 1/1994 | Besaw et al. |
| 5,440,722 A | 8/1995 | VanderSpek et al. |
| 5,539,883 A | 7/1996 | Allon et al. |
| 5,572,724 A | 11/1996 | Watanabe et al. |
| 5,659,694 A | 8/1997 | Bibayan |
| 5,699,532 A | 12/1997 | Barrett et al. |
| 5,761,429 A | 6/1998 | Thompson |
| 5,784,552 A | 7/1998 | Bishop et al. |
| 5,983,310 A | 11/1999 | Adams |
| 5,996,012 A | 11/1999 | Jarriel |
| 6,009,455 A | 12/1999 | Doyle |
| 6,061,505 A | 5/2000 | Pitchaikani et al. |
| 6,098,108 A | 8/2000 | Sridhar et al. |
| 6,182,086 B1 | 1/2001 | Lomet et al. |
| 6,209,018 B1 | 3/2001 | Ben-Shachar et al. |
| 6,226,675 B1 | 5/2001 | Meltzer et al. |
| 6,256,740 B1 | 7/2001 | Muller et al. |
| 6,289,382 B1 | 9/2001 | Bowman-Amuah |
| 6,385,639 B1 | 5/2002 | Togawa |

(Continued)

FOREIGN PATENT DOCUMENTS

JP 05-216845 8/1993

(Continued)

OTHER PUBLICATIONS

"eserver xSeries 335 Type 8676 User's Guide", Feb. 2003, IBM Product User's Guide Chapter 1, pp. 1-12.*

(Continued)

*Primary Examiner*—James Rutten
(74) *Attorney, Agent, or Firm*—Finnegan, Henderson, Farabow, Garrett & Dunner LLP (57) ABSTRACT

A method including, in a grid network, determining available compute devices for installation and execution of an application, the application requiring a specific operating system. The method also includes, in response to determining that there are no available compute devices having the specific operating system, sending a request to install the specific operating system and a grid manager through a link to a management system. The method also includes installing the specific operating system on one of a plurality of compute devices controlled by the management system and linking the one of a plurality of compute devices controlled by the management system to the grid network. Lastly, the method includes installing the application on the one of a plurality of compute devices controlled by the management system.

17 Claims, 5 Drawing Sheets

U.S. PATENT DOCUMENTS

| | | |
|---|---|---|
| 6,401,097 B1 | 6/2002 | McCotter et al. |
| 6,453,349 B1 | 9/2002 | Kano et al. |
| 6,466,980 B1 | 10/2002 | Lumelsky et al. |
| 6,502,131 B1 | 12/2002 | Vaid et al. |
| 6,567,838 B1 | 5/2003 | Korenshtein |
| 6,597,956 B1 * | 7/2003 | Aziz et al. ................... 700/3 |
| 6,615,278 B1 | 9/2003 | Curtis |
| 6,628,304 B2 | 9/2003 | Mitchell et al. |
| 6,650,347 B1 | 11/2003 | Nulu et al. |
| 6,751,795 B1 | 6/2004 | Nakamura |
| 6,775,830 B1 | 8/2004 | Matsunami et al. |
| 6,789,170 B1 | 9/2004 | Jacobs et al. |
| 6,799,251 B1 | 9/2004 | Jacobs et al. |
| 6,813,637 B2 | 11/2004 | Cable |
| 6,816,944 B2 | 11/2004 | Peng |
| 6,826,568 B2 | 11/2004 | Bernstein et al. |
| 6,832,220 B1 | 12/2004 | Rahman |
| 6,834,301 B1 | 12/2004 | Hanchett |
| 6,859,834 B1 | 2/2005 | Arora et al. |
| 6,912,587 B1 | 6/2005 | O'Neil |
| 6,918,113 B2 | 7/2005 | Patel et al. |
| 6,967,728 B1 | 11/2005 | Vidyanand |
| 6,976,258 B1 | 12/2005 | Goyal et al. |
| 7,010,596 B2 | 3/2006 | Bantz et al. |
| 7,051,107 B2 | 5/2006 | Morikawa |
| 7,093,243 B2 | 8/2006 | Bailey et al. |
| 7,096,248 B2 | 8/2006 | Masters et al. |
| 7,103,594 B1 | 9/2006 | Wolfe |
| 7,124,062 B2 | 10/2006 | Gebhart |
| 7,130,891 B2 | 10/2006 | Bernardin et al. |
| 7,171,470 B2 | 1/2007 | Doyle et al. |
| 7,171,654 B2 | 1/2007 | Werme et al. |
| 7,181,743 B2 | 2/2007 | Werme et al. |
| 7,185,046 B2 | 2/2007 | Ferstl et al. |
| 7,234,032 B2 | 6/2007 | Durham et al. |
| 7,290,048 B1 | 10/2007 | Barnett et al. |
| 7,302,425 B1 | 11/2007 | Bernstein et al. |
| 7,322,031 B2 | 1/2008 | Davis et al. |
| 7,328,406 B2 | 2/2008 | Kalinoski et al. |
| 7,509,412 B2 | 3/2009 | Creamer et al. |
| 7,546,598 B2 | 6/2009 | Blumenthal et al. |
| 7,574,661 B2 | 8/2009 | Matsuura et al. |
| 2001/0049594 A1 | 12/2001 | Klevans |
| 2001/0054034 A1 | 12/2001 | Arning et al. |
| 2002/0019844 A1 * | 2/2002 | Kurowski et al. ........... 709/201 |
| 2002/0078209 A1 | 6/2002 | Peng |
| 2002/0083183 A1 | 6/2002 | Pujare et al. |
| 2002/0095434 A1 | 7/2002 | Lane |
| 2002/0167954 A1 | 11/2002 | Highsmith et al. |
| 2002/0174189 A1 | 11/2002 | Peng |
| 2002/0194251 A1 | 12/2002 | Richter et al. |
| 2003/0005068 A1 | 1/2003 | Nickel et al. |
| 2003/0033369 A1 | 2/2003 | Bernhard |
| 2003/0041061 A1 | 2/2003 | Harrisville-Wolff et al. |
| 2003/0041142 A1 | 2/2003 | Zhang et al. |
| 2003/0088580 A1 | 5/2003 | Desai et al. |
| 2003/0093528 A1 | 5/2003 | Rolia |
| 2003/0101331 A1 | 5/2003 | Boylan et al. |
| 2003/0126196 A1 | 7/2003 | Lagimonier et al. |
| 2003/0126265 A1 | 7/2003 | Aziz et al. |
| 2003/0197726 A1 | 10/2003 | Weitzman |
| 2004/0179481 A1 | 9/2004 | Graupner |
| 2004/0194084 A1 | 9/2004 | Matsunami et al. |
| 2004/0215590 A1 | 10/2004 | Kroening |
| 2004/0215973 A1 | 10/2004 | Kroening |
| 2004/0225711 A1 | 11/2004 | Burnett et al. |
| 2004/0255291 A1 | 12/2004 | Sierer et al. |
| 2004/0261053 A1 | 12/2004 | Dougherty et al. |
| 2004/0268147 A1 | 12/2004 | Wiederin et al. |
| 2004/0268293 A1 * | 12/2004 | Woodgeard ................ 717/101 |
| 2005/0015437 A1 | 1/2005 | Strait |
| 2005/0015643 A1 | 1/2005 | Davis et al. |
| 2005/0027785 A1 | 2/2005 | Bozak et al. |
| 2005/0027812 A1 | 2/2005 | Bozak et al. |
| 2005/0027813 A1 | 2/2005 | Bozak et al. |
| 2005/0027843 A1 | 2/2005 | Bozak et al. |
| 2005/0027864 A1 | 2/2005 | Bozak et al. |
| 2005/0027865 A1 | 2/2005 | Bozak et al. |
| 2005/0044251 A1 | 2/2005 | Bozak et al. |
| 2005/0060272 A1 | 3/2005 | Lin |
| 2005/0060349 A1 | 3/2005 | Shirin et al. |
| 2005/0076105 A1 | 4/2005 | Keohane et al. |
| 2005/0076339 A1 | 4/2005 | Merril et al. |
| 2005/0125537 A1 | 6/2005 | Martins et al. |
| 2005/0131898 A1 | 6/2005 | Fatula, Jr. |
| 2005/0138618 A1 * | 6/2005 | Gebhart ................... 717/176 |
| 2005/0149294 A1 | 7/2005 | Gebhart |
| 2005/0160107 A1 | 7/2005 | Liang |
| 2005/0160423 A1 | 7/2005 | Bantz et al. |
| 2005/0165912 A1 | 7/2005 | Colbeck et al. |
| 2005/0183143 A1 | 8/2005 | Anderholm et al. |
| 2005/0235055 A1 * | 10/2005 | Davidson ................... 709/223 |
| 2005/0262506 A1 | 11/2005 | Dawson et al. |
| 2006/0005181 A1 * | 1/2006 | Fellenstein et al. ......... 717/174 |
| 2006/0015285 A1 | 1/2006 | Fuller et al. |
| 2006/0075070 A1 | 4/2006 | Merissert-Coffinieres et al. |
| 2006/0168158 A1 | 7/2006 | Das |
| 2006/0277271 A1 | 12/2006 | Morse et al. |
| 2006/0294238 A1 | 12/2006 | Naik et al. |
| 2008/0052729 A1 | 2/2008 | Paul et al. |
| 2009/0007131 A1 | 1/2009 | Woodgeard |
| 2009/0113395 A1 | 4/2009 | Creamer et al. |

FOREIGN PATENT DOCUMENTS

| | | |
|---|---|---|
| JP | 07-311743 | 11/1995 |
| JP | 08-055059 | 2/1996 |
| JP | 08314872 | 11/1996 |
| JP | 10-105383 | 4/1998 |
| JP | 2000-078156 | 3/2000 |
| JP | 2001-331321 | 11/2001 |
| JP | 2002-528797 | 9/2002 |
| JP | 2004-508616 | 3/2004 |
| WO | WO 01/13227 A2 | 2/2001 |
| WO | WO 02/03203 A2 | 1/2002 |

OTHER PUBLICATIONS

"IBM eserver xSeries 335" Publicaton date unknown, IBM Data Sheet, accessed online on Dec. 27 at <http://www.ibm.com/servers/uk/eserver/xseries/literature/xseries_335.html>, 2 pages.*

Limaye, K.; Leangsuksun, B.; Munganuru, V.K.; Greenwood, Z.; Scott, S.L.; Libby, R.; Chanchio, K., "Grid aware HA-OSCAR," High Performance Computing Systems and Applications, 2005. HPCS 2005. 19th International Symposium on , vol., no.pp. 333-339, May 15-18, 2005.*

Chuang, Liu et al., "Design and Evaluation of a Resource Selection Framework for Grid Applications," High Performance Distributed Computing 2002, HPDC-11, 2002, Proceedings 11th IEEE International Symposium, Jul. 23-26, 2002, pp. 63-72.

Chase, Jeffrey S., et al., "Dynamic Virtual Clusters in a Grid Site Manager," High Performance Distributed Computing, 2003, Proceedings 12th IEEE International Symposium on Jun. 22-24, 2003, pp. 90-100.

"Hp blade server data sheet," HP Blade Server Data Sheet, Nov. 2001, pp. 2-6.

"How Sun™ Grid Engine, Enterprise Edition 5.3 Works," Nov. 2001, Policy Systems in Sun Grid Engine, Enterprise Edition 5.3 Software, 1-16.

"Sun Cluster Grid Architecture," Sun Microsystems, Inc. 1-42 (2002).

"Sun Powers the Grid," Sun Microsystems, Inc., 1-7 (Feb. 2002).

Berstis, "Fundamentals of Grid Computing," IBM Corporation, Redbooks Paper, 1-28 (2002).

Braden et al., "Resource ReSerVation Protocol (RSVP), Version 1 Functional Specification," Aug. 12, 1996.
Buyya, "Nimrod/G: An Architecture for a Resource Management and Scheduling System in a Global Computational Grid," IEEE Computer Society Press, USA, 2000.
Buyya, "Economic-based Distributed Resource Management and Scheduling for Grid Computing," Apr. 2002.
Czajkowski et al., "Resource Co-Allocation in Computational Grids" High-Performance Distributed Computing Archive, Proceedings of the 8th IEEE International Symposium on High Performance Distributed Computing, 1999.
Dubinsky et al., "A Flexible Rerouting Protocol in ATM Networks," IEEE Infocom '99, Conference on Computer Communications, Proceedings, 18th Annual Joint Conference of the IEEE Computer and Communications Societies, vol. 3, pp. 1488-1496, Mar. 1999.
European Search Opinion, dated Aug. 1, 2007, for corresponding EP Application No. 05 027 222.8 (5 pages).
European Search Opinion, dated May 18, 2006, for corresponding EP Application No. 05 027 222.8 (5 pages).
European Search Report dated Mar. 15, 2006 pertaining to Application No. 05027221.0-2211.
European Search Report dated Mar. 13, 2006 pertaining to Application No. 05027543.7-2211, 7 pages.
Ferreira et al., "Introduction to Grid Computing with Globus," IBM Corporation, Redbooks, 2nd Edition, 1-268, (2003).
Ferris et al., "NEOS and CONDOR: Solving Optimization Problems Over the Internet," CRPC-TR98763-S, Mar. 1998, pp. 1-17 Rice University, Houston, TX.
Foster et al., "A Distributed Resource Management Architecture that Supports Advance Reservations and Co-Allocation," IEEE 1999.
Foster et al., "A Quality of Service Architecture that Combines Resource Reservation and Application Adaptation," 2000, pp. 181-188, IEEE, Piscataway, NJ.
Foster et al., "The Anatomy of the Grid: Enabling Scalable Virtual Organizations," 2001, pp. 1-25, Argonne National Laboratory, Argonne, IL; University of Chicago, Chicago, IL; University of Southern California, Marina del Rey, CA.
Foster et al., "The Anatomy of the Grid: Enabling Scalable Virtual Organizations," The International Journal of High Performance Computing Applications, vol. 5, No. 3, Fall 2001.
Foster et al., "The Physiology of the Grid," 2002, An Open Grid Services Architecture for Distributed Systems Integration, pp. 1-31, Argonne National Laboratory, Argonne, IL; Univeristy of Chicago, Chicago, IL; University of Southern California, Marina del Rey, CA; IBM Corporation, Poughkeepsie, NY.
Goyal, "Oracle and the Grid," An Oracle White Paper, Oracle Corporation, 1-15 (Nov. 2002).
International Search Report for PCT/EP2004/008406, dated Dec. 28, 2004, 7 pgs.
International Search Report for PCT/EP2004/008407, dated Jan. 19, 2005, 6 pgs.
International Search Report for PCT/EP2004/008408, dated Mar. 21, 2005, 16 pgs.
International Search Report for PCT/EP2004/008409, dated Dec. 29, 2004, 6 pgs.
International Search Report for PCT/EP2004/008448, dated Jan. 19, 2005, 7 pgs.
International Search Report for PCT/EP2004/008449, dated Jan. 19, 2005, 6 pgs.
Kónya., "The NorduGrid Information System," Retrieved from the Internet: http://www.nordugrid.org, Sep. 16, 2002.
Kónya, et al., "The NorduGrid Architecture and Tools," Retrieved from the Internet: http://www.nordugrid.org, Mar. 2002.
Lacan, "A Perfect World? A model for transformation," IBM Business Consultilng Services, 1-12, (Apr. 2003).
Laszewski et al., "CoG Kits: A Bridge Between Commodity Distributed Computing and High-Performance Grids," Retrieved from the Internet: http://www-unix.mcs.anl.gov, Jun. 2000.
Lee et al., "visPerf: Monitoring Tool for Grid Computing," Retrieved from the Internet: http://icl.cs.utk.edu.projectsfiles/netsolve/pubs/visperf.pdf, pp. 1-13, Jun. 2003.

Li et al., "Improving Performance via Computational Replication on a Large-Scale Computational Grid," Proceedings of the 3rd IEEE/ACM International Symposium on Cluster Computing and the Grid, 2003, pp. 1-7.
Min et al., "A CICS to Linux Grid Implementation," IBM Corporation, Redbooks Paper, 1-24 (2003).
Nabrzyski et al., "Grid Resource Management, State of the Art and Future Trends," Sep. 2003, Kluwer Academic Publishers.
Oracle RAC 10g Overview, Oracle, An Oracle White Paper, pp. 1-16, Nov. 2003.
Papakhian, "Comparing Job-Management Systems: The User's Perspective," Apr.-Jun. 1998, vol. 5, No. 2, pp. 4-9, Technology News and Reviews, IEEE Computational Science & Engineering.
Sandholm et al., "Java OGSI Hosting Environment Design A Portable Grid Service Container Framework," 2002, pp. 1-19, Argonne National Laboratory, IBM Poughkeepsie, NY.
Tierney et al., White Paper: A Grid Monitoring Service Architecture (DRAFT), Retrieved from the internet http://citeseer.ist.psu.edu/530951.htm, Feb. 2001.
Tuecke, "Open Grid Services Infrastructure (OGSI) Version 1.0," Jun. 27, 2003, ogsi-wg@ggf.org, Global Grid Forum, 1-86.
Walsh et al., "Staged Simulation for Improving Scale and Performance of Wireless Network Simulations," Institute of Electrical and Electronics Engineers, Proceedings of the 2003 Winter Simulation Conference, New Orleans, Dec. 7-10, 2003, IEEE, vol. 2 of 2, pp. 667-675.
Allcock et al., "Grid Mapper: A Tool for Visualizing the Behavior of Large-Scale Distributed Systems," (Proceedings 11th IEEE International Symposium on High Performance Distributed Computing IEEE Comput. Soc., Piscataway, NJ, pp. 179-187), Jul. 2002.
Allen et al., "The Cactus Worm: Experiments With Dynamic Resource Discovery and Allocation in a Grid Environment," (International Journal of High Performance Computing Applications Sage Science Press, vol. 15, No. 4, pp. 345-358), 2001.
Baldridge et al., "QMView and GAMESS: Integration into the World Wide Computational Grid," (Conference on High Performance Networking and Computing, Proceedings of the 2002 ACM/IEEE conference on Supercomputing, pp. 1-25), 2002.
Beiriger et al., "Constructing the ASCI Computational Grid," p. 193-9, (Proceedings of the Ninth IEEE Symposium on High-Performance Distributed Computing), 2000.
Czajkowski et al, "Grid Information Services for Distributed Resource Sharing," (Proceedings of the Tenth IEEE International Symposium on High-Performance Distributed Computing, pp. 1-14), 2001.
Czajkowski et al., "A Resource Management Architecture for Metacomputing Systems," (Proc. IPPS/SPDP '98 Workshop on Job Scheduling Strategies for Parallel Processing, University of Southern California, Marina del Rey, CA; Mathematics and Computer Science Division, Argonne National Laboratory, Argonne, IL, pp. 62-82), 1998.
European Search Report for Application No. 05027222.8, dated May 18, 2006 (9 pages).
Foster et al., "A Grid-Enabled MPI: Message Passing in Heterogeneous Distributed Computing Systems," IEEE Comput. Soc., Los Alamitos, CA, p. 15, 1998.
Frey et al., "Condor-G: A Computation Management Agent for Multi-Institutional Grids," (Kluwer Academic Publishers, Netherlands, vol. 5, No. 3, pp. 237-246), 2002.
Goteti et al., "Communication Pattern Based Node Selection for Shared Networks," Automonic Computing Workshop: The Fifth Annual International Workshop on Active Middleware Services, pp. 1-8, (Jun. 2003).
Goux et al., "An Enabling Framework for Master-Worker Applications on the Computational Grid," (Proceedings of the $9^{th}$ IEEE International Symposium on High Performance Distributed Computing, pp. 43-60), 2000.
Litzkow et al., "Condor - A Hunter of Idle Workstations," (8th International Conference on Distributed Computing Systems, pp. 104-111), Jun. 1988.
Lowekamp et al., "A Resource Query Interface for Network-Aware Applications," (Cluster Computing vol. 2, No. 2, Springer Netherlands, pp. 139-151), Sep. 1999.

Oracle Grid Computing Technologies [online]. Oracle, [retrieved on Apr. 15, 2004]. Retrieved from the Internet: http://otn.oracle.com/products/oracle9i/gridcomputing/index.html. 2 pages.

Ting et al., "3LS: A Peer-to-Peer Network Simulator," (Third International Conference on Peer-to-Peer Computing, pp. 212-213), Sep. 2003.

Vadhiyar et al., "A Performance Oriented Migration Framework for the Grid," (Proceedings of the Third IEEE/ACM International Symposium on Cluster Computing and the Grid, pp. 130-137), May 2003.

von Laszewski et al., "InfoGram: A Grid Service that Supports Both Information Queries and Job Execution," (Proceedings of the 11th IEEE International Symposium on High Performance Distributed Computing, (HPDC '02), pp. 333-342), 2002.

von Laszewski, et al., "Designing Grid-based Problem Solving Environments and Portals," (Proceedings of the 34th Annual Hawaii International Conference on System Sciences, pp. 1-10), Jan. 2001.

von Laszewski, et al., "Grid-Based Asynchronous Migration of Execution Context in Java Virtual Machines," (Euro-Par 2000 Parallel Processing, 6th International Euro-Par Conference Proceedings, Lecture Notes in Computer Science, vol. 1900, pp. 22-34), Sep. 2000.

Wäänänen et al., "An Overview of an Architecture Proposal for a High Energy Physics Grid," (Applied Parallel Computing, Advanced Scientific Computing, 6th International Conference, pp. 76-86), Jun. 2002.

U.S. Appl. No. 10/706,377, filed Nov. 12, 2003, entitled "Grid Landscape Component," 19 pages Specification, including cover page and Abstract, and 8 sheets of drawings.

U.S. Appl. No. 10/706,066, filed Nov. 12, 2003, entitled Maintainable Grid Managers, 19 pages Specification, including cover page and Abstract, and 8 sheets of drawings.

U.S. Appl. No. 10/706,805, filed Nov. 12, 2003, entitled "Application Start Protocol," 23 pages Specification, including cover page and Abstract, and 8 sheets of drawings.

U.S. Appl. No. 10/712,154, filed Nov. 12, 2003, entitled "Install-Run-Remove mechanism," 20 pages Specification, including cover page and Abstract, and 8 sheets of drawings.

U.S. Appl. No. 10/712,155, filed Nov. 12, 2003, entitled "Grid Organization," 22 pages Specification, including cover page and Abstract, and 8 sheet drawings.

U.S. Appl. No. 12/326,441, filed Dec. 2, 2008, entitled "Grid Organization," 28 pages Specification, including cover page and Abstract, and 8 sheets of drawings.

U.S. Appl. No. 10/712,886, filed Nov. 12, 2003, entitled "Grid Browser Component," 20 pages Specification, including cover page and Abstract, and 8 sheets of drawings.

U.S. Appl. No. 10/712,156, filed Nov. 12, 2003, entitled "Grid Manageable Application Process Management," 20 pages Specification, including cover page and Abstract, and 8 sheets of drawings.

U.S. Appl. No. 10/749,754, filed Dec. 30, 2003, entitled "Service Search Method," 17 pages Specification, including cover page and Abstract, and 4 sheets of drawings.

U.S. Appl. No. 10/742,655, filed Dec. 19, 2003, entitled "Grid Application Customization," 16 pages Specification, including cover page and Abstract, and 5 sheets of drawings.

U.S. Appl. No. 11/017,089, filed Dec. 20, 2004, entitled "Grid Application Acceleration," 11 pages Specification, including cover page and Abstract, and 3 sheets of drawings.

U.S. Appl. No. 11/017,088, filed Dec. 20, 2004, entitled "Application Recovery," 12 pages Specification, including cover page and Abstract, and 2 sheets of drawings.

Jitsumori, Hitoshi, "Beginning of the Grid Computing Era," Nikkei Internet Solutions, vol. 69, pp. 81-89, Nikkei Business Publications, Inc., Mar. 22, 2003.

Jitsumori, Hitoshi, "Concentrated Control of a Plurality of Computers as One System," Nikkei Internet Technology, vol. 59, p. 14-15, Nikkei Business Publications, Inc., May 22, 2002.

Official Notice of Rejection mailed on Apr. 10, 2009 of Japanese Patent Application No. 2006-521509, (2 pages) and translation thereof (3 pages).

Official Notice of Rejection mailed on Apr. 14, 2009 of Japanese Patent Application No. 2006-521512, (5 pages) and translation thereof (6 pages).

Official Notice of Rejection mailed on Apr. 21, 2009 of Japanese Patent Application No. 2006-521513, (2 pages) and translation thereof (3 pages).

Official Notice of Rejection mailed on Apr. 24, 2009 of Japanese Patent Application No. 2006-521515, (3 pages) and translation thereof (4 pages).

"Caching in on the Enterprise Grid Turbo-Charge Your Applications with OracleAS Web Cache," An Oracle Technical White Paper, Oracle Fusion Middleware, Oracle Corporation, Redwood Shores, CA, Sep. 2005, pp. 1-33.

About Grid computing [online]. IBM, [retrieved on Apr. 14, 2004]. Retrieved from the Internet: http://www-1.ibm.com/grid/about_grid/index.shtml. 1 page.

Ali et al., "Predicting the Resource Requirements of a Job Submission," California Institute of Technology, pp. 1-4, 2004.

Cactus 4.0, User's Guide, Rev. 1.45, Publisher Unknown. Chapter D9, dated Jan. 19, 2004 (3 pages).

El-Ghazawi, Tarek et al., "A Performance Study of Job Management Systems," Concurrency and Computation: Practice and Experience, John Wiley & Sons, Ltd., pp. 1229-1246, vol. 16 Issue 13, Oct. 2004.

FAQ [online]. IBM, [retrieved on Apr. 14, 2004]. Retrieved from the Internet: http://www-1.ibm.com/grid/about grid/faq.shtml. 4 pages.

Ferreira, et al., "Introduction to Grid Computing with Globus," IBM Corporation, Redbooks, 2nd Edition, pp. 1-268, (2003).

Grid Benefits [online]. IBM, [retrieved on Apr. 14, 2004]. Retrieved from the Internet: http://www-1.ibm.com/grid/about grid/benefits.shtml. pp. 1-2.

IBM and grid: E-business on demand [online]. IBM, [retrieved on Apr. 14, 2004]. Retrieved from the Internet: http://www-1.ibm.com/grid/about grid/ibm grid/ebod.shtml. 1 page.

IBM and grid: IBM using grid today [online]. IBM, [retrieved on Apr. 14, 2004]. Retrieved from the Internet: http://www-1.ibm.com/grid/about grid/ibm grid/grid today.shtml. 1 page.

IBM and grid: Open standards [online]. IBM, [retrieved on Apr. 14, 2004]. Retrieved from the Internet: http://www-1.ibm.com/grid/about grid/ibm grid/open standards.shtml. 1 page.

IBM and grid: Overview [online]. IBM, [retrieved on Apr. 14, 2004]. Retrieved from the Internet: http://www-1.ibm.com/grid/about grid/ibm grid/index.shtml. 1 page.

IBM and grid: Products and services [online]. IBM, [retrieved on Apr. 14, 2004]. Retrieved from the Internet: http://www-1.ibm.com/grid/about grid/ibm grid/products services.shtml. 1 page.

IBM and grid: Strategic relationships [online]. IBM, [retrieved on Apr. 14, 2004]. Retrieved from the Internet: http://www-1.ibm.com/grid/about grid/ibm grid/strategicrelation.shtml. 1 page.

IBM Grid computing [online]. IBM, [retrieved on Apr. 14, 2004]. Retrieved from the Internet: http://www-1.ibm.com/linux/grid/. 1 page.

Injey, Franck, "External Time Reference (ETR) Requirements on z990," IBM Corporation, Redbooks Flash, pp. 1-20 (2004).

Jang et al., "A Path Based Internet Cache Design for GRID Application," Lecture Notes in Computer Science 3033, Springer-Verlag Berlin Heidelberg, Dec. 2003, pp. 455-458.

Smith, G., Oracle RAC 10g Overview, Oracle, An Oracle White Paper, Oracle Corporation, Redwood Shores, CA 94065, pp. 1-15, Nov. 2003.

Soulder, Benny, "On The Grid," Oracle Corporation, pp. 1-4 (2004).

Special Edition Using Microsoft Excel 2000, Copyright 1999 by Que Corp., pp. 67-68.

What is grid computing [online]. IBM, [retrieved on Apr. 14, 2004]. Retrieved from the Internet: http://www-1.ibm.com/grid/about grid/what is.shtml. 1 page.

Zenses, Ralf, "N1 Grid Advanced Architecture for SAP Operating concept for SAP Infrastructure," Germany/Austria Sun Microsystems GmbH, Mar. 5, 2004, pp. 1-34.

Zhang et al., "Fault-tolerant Grid Services Using Primary-Backup: Feasibility and Performance," Cluster Computing, 2004 IEEE International Conference, San Diego, CA Sep. 20-23, 2004, pp. 105-114.

"Grid Computing Q&A with Benny Souder, Vice President, Distributed Database Development, Database and Application Server Technologies," May 22, 2003, pp. 1-9.

"Sun's Grid Computing Solutions Outdistance the competition," Executive White Paper, Aberdeen Group, Inc., Boston, MA, pp. 1-20 (May 2002).

Berman et al., "The GrADS Project: Software Support for High-Level Grid Application Development," International Journal of High Performance Computing Applications, Sage Science Press, vol. 15, No. 4, pp. 327-344, Jul. 31, 2001.

Berman et al., "Application-Level Scheduling on Distributed Heterogeneous Networks (Technical Paper)," Proceedings of Supercomputing '96, 1996, Article No. 39, pp. 1-28, University of California—San Diego, La Jolla, CA.

Goodale et al., "Checkpoint/Recovery in Cactus 4.0," Max Planck Institute for Gravitational Physics, Oct. 16, 2002 (7 pages).

Sgaravatto et al., "Grid Checkpointing in the European DataGrid Project," Istituto Nazionale di Fisica Nucleare, Oct. 16, 2002 (5 pages).

English Language Translation of Official Final Decision of Rejection mailed on Aug. 11, 2009 of Japanese Patent Application No. 2006-521512 (2 pages).

Official Notice of Rejection mailed on Sep. 11, 2009 of Japanese Patent Application No. 2006-521516, (6 pages) and translation thereof (6 pages).

Al-Ali et al., "QoS adaptation in service-oriented grids," Proceedings of the 1st Int'l Workshop on Middleware for Grid Computing (MGC2003), Rio de Janeiro, Brazil, Jun. 2003, retrieved from the internet on Oct. 19, 2009 (11 pages) via http://citeseerx.ist.psu.edu/viewdoc/summary?doi=10.1.1.105.2673 (11 pages).

European Examination Report, dated Nov. 4, 2009, for corresponding EP Application No. 04 741 290.3-1243 (5 pages).

European Examination Report, dated Nov. 4, 2009, for corresponding EP Application No. 04 763 539.6-1243 (6 pages).

Johner et al., "Understanding LDAP," IBM Redbook, Jun. 1998, retrieved from the internet on Feb. 2, 2008, (196 pages) http://keinzerberus2000.aldebaran.de/LDAPIBMUnderstandingsg244986.pdf.

* cited by examiner

GRID COMPUTE NODE SOFTWARE APPLICATION DEPLOYMENT

TECHNICAL FIELD

This invention relates to grid application deployment.

BACKGROUND

In today's data centers, the clusters of servers in a client-server network that run business applications often do a poor job of managing unpredictable workloads. One server may sit idle, while another is constrained. This leads to a "Catch-22" where companies, needing to avoid network bottlenecks and safeguard connectivity with customers, business partners and employees, often plan for the highest spikes in workload demand, then watch as those surplus servers operate well under capacity most of the time.

In grid computing, all of the disparate computers and systems in an organization or among organizations become one large, integrated computing system. Grid computing is a form of distributed system wherein computing resources are shared across networks. Grid computing enables the selection, aggregation, and sharing of information resources resident in multiple administrative domains and across geographic areas.

Typically, grid computing includes a set of software services that allocate computer resources to different applications. These software services usually run on a software layer of computer systems and cannot modify certain lower level features of the computer systems such as operating systems. Modifying these features can require rebooting the computer systems.

SUMMARY

In one aspect, the invention features a method including, in a grid network, determining available compute devices for installation and execution of an application, the application requiring a specific operating system. The method also includes, in response to determining that there are no available compute devices having the specific operating system, sending a request to install the specific operating system and a grid manager through a link to a management system. The method also includes installing the specific operating system on one of a plurality of compute devices controlled by the management system and linking the one of a plurality of compute devices controlled by the management system to the grid network. Lastly, the method includes installing the application on the one of a plurality of compute devices controlled by the management system.

Embodiments may include one or more of the following. The method further includes executing the application in the one of a plurality of compute devices controlled by the management system. The plurality of compute devices controlled by the management system are blade servers and the management system is a blade management system. Sending includes an application programming interface (API). Installing the specific operating system further includes installing a grid manager.

In another aspect, the invention features a computer program product, tangibly embodied in an information carrier, for deploying an application, the computer program product being operable to cause a data processing apparatus to do the following. In a grid network, determine available compute devices for installation and execution of the application, the application requiring a specific operating system platform. In response to determining that there are no available compute devices having the specific operating system platform, send a request to install the specific operating system and a grid manager through a link to a management system. Install the specific operating system on one of a plurality of compute devices controlled by the management system. Link the one of a plurality of compute devices controlled by the management system to the grid network.

In embodiments, the computer program product is being operable to further cause a data processing apparatus to execute the application in the one of a plurality of compute devices controlled by the management system. The plurality of compute devices controlled by the management system are blade servers and the management system is a blade management system. The product is further operable to cause the data processing apparatus to use an application programming interface (API) to send the request. The product is further operable to cause the data processing apparatus to install a grid manager.

In another aspect, the invention features a system that includes a client system residing in a grid network of interconnected grid compute devices, means for receiving a request in the client system to deploy and execute an application, the application requiring a specific operating system, the specific operating system unavailable in the interconnected grid compute devices, means for sending a request to install the specific operating system and a grid manager through a link to a management system. The system also includes means for installing the specific operating system in one of a plurality of compute devices controlled by the management system, means for installing the grid manager in one of a plurality of compute devices controlled by the management system, means for linking the one of a plurality of compute devices controlled by the management system to the grid network, and means for installing the application in the one of a plurality of compute devices controlled by the management system.

Embodiments may include one or more of the following. The system further includes means for executing the application in the one of a plurality of compute devices controlled by the management system. The means for sending use an application programming interface (API). The plurality of compute devices controlled by the management system are blade servers and the management system is a blade management system.

Embodiments of the invention may have one or more of the following advantages. Requirements for a software application to run in a grid environment, such as a particular operating system, can be satisfied by dynamically configuring resources of the grid environment.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
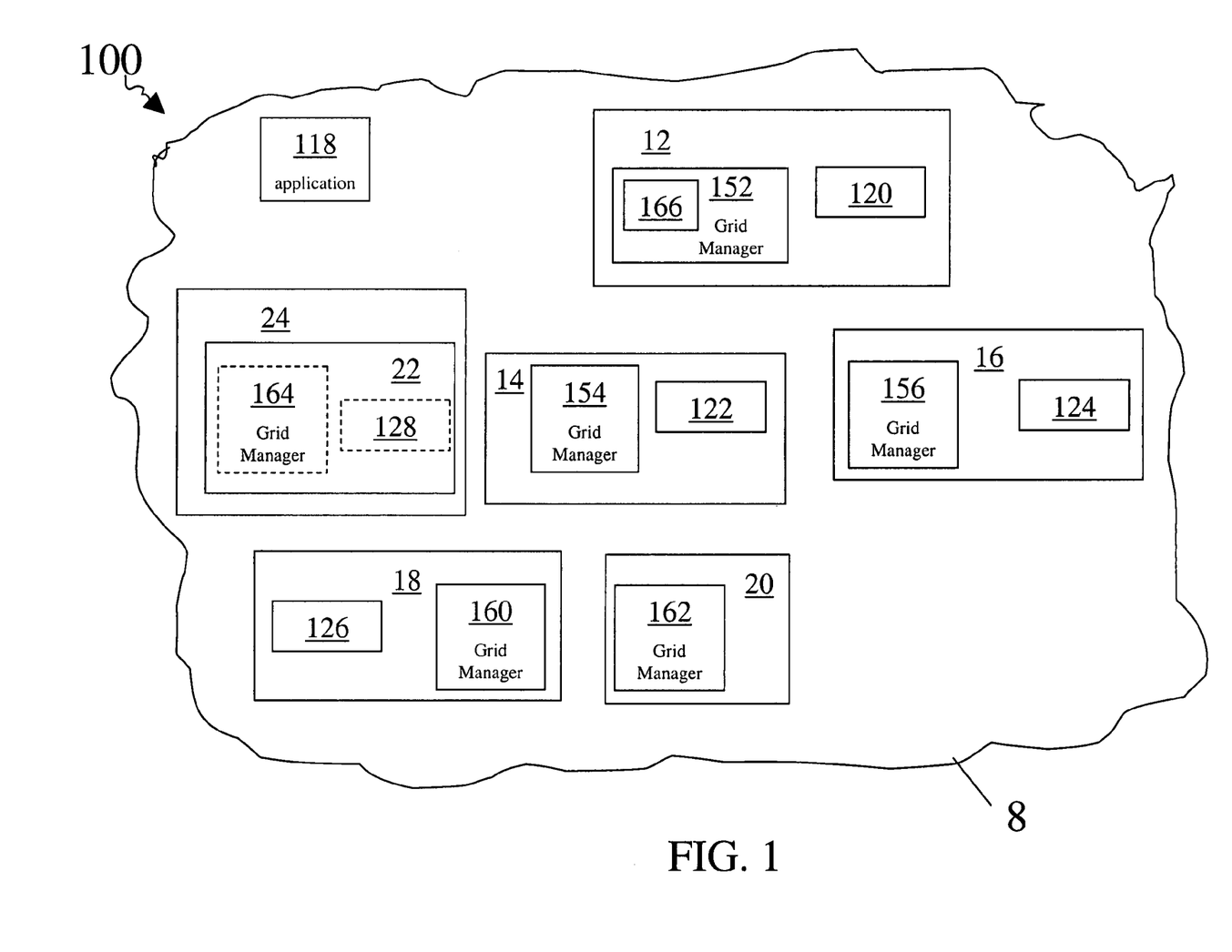
FIG. 1 is a block diagram of a grid computing environment.

As shown in FIG. 1, grid managers 152, 154, 156, 160, 162 in a grid computing environment 100 manage computational resources for one or more applications 118. The grid computing environment 100 includes a set of distributed computing resources that can individually be requested by the applications 118 to perform computing or data retrieval tasks for the applications 118. The grid managers 152, 154, 156, 160, 162 can be arranged in a hierarchical, linear, or some other form of architecture to coordinate handling requests by the applications 118. The computational resources include computer devices 12, 14, 16, 18, 20, 22. The grid managers 152, 154, 156, 160, 162 are resident in the computer devices 12, 14, 16, 18, 20, respectively. The computer devices 12, 14, 16, 18, 20 communicate using a network 8. The network 8 can be a local area network (LAN) or a larger group of interconnected systems such as the Internet. In other cases, the computer devices 12, 14, 16, 18, 20 are single board computers and the network 8 is a data bus. The grid managers 152, 154, 156, 160, 162 facilitate installation and deinstallation of transient software components of applications 118 on the computer devices 12, 14, 16, 18, and 20. The grid managers 152, 154, 156, 160, 162 also manage the software components while they are present on the computer devices 12, 14, 16, 18, 20, 22, respectively. In the grid computing environment 100, the software components 120, 122, 124, 126 are installed on the computer devices 12, 14, 16, and 18, respectively, and managed by the grid managers 152, 154, 156, 160, respectively.

Grid computing environment 100 also includes a computer device 22 that is managed by computer management system 24. The computer manager system 24 can install an operating system on the computer device 22 by writing an operating system to a boot device for the computer device 22 and rebooting the computer device 22. The computer device 22 can communicate with the computer devices 12, 14, 16, 18, and 20 through the computer management system 24 using the network 8. Computer device 22 can be a blade server and the computer management system 24 can be a blade management system. A blade server is a thin, modular electronic circuit board, containing one, two, or more microprocessors and memory, that can be easily inserted into a space-saving rack with many similar servers that are managed by a blade management system. Blade servers, which share a common high-speed bus, are designed to generate less heat and thus save energy costs as well as space. A blade server is sometimes referred to as a high-density server and is typically used in a clustering of servers.

Figure 2:
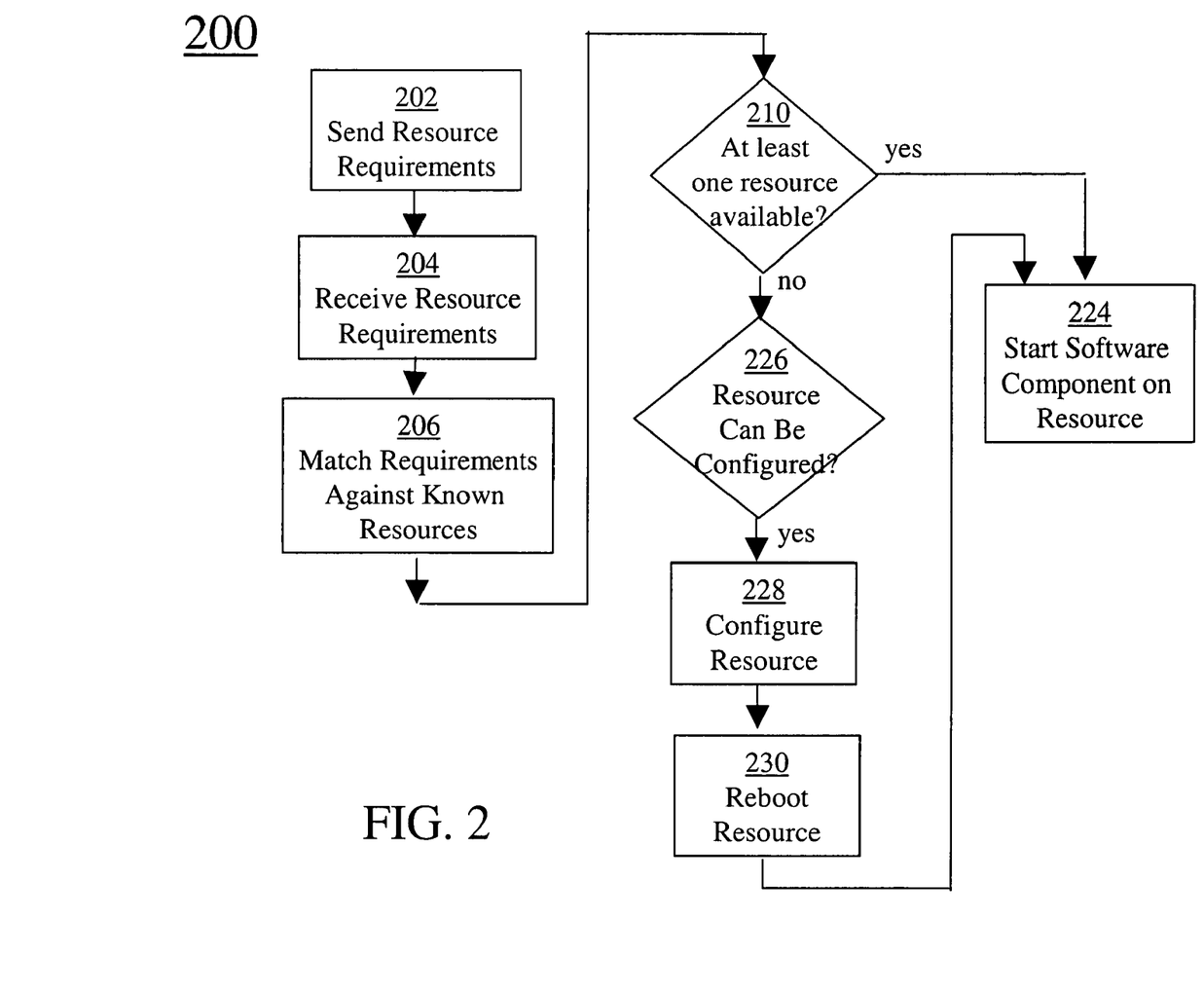
FIG. 2 is a flow diagram for discovering, configuring, and reserving resources in the grid computing environment of FIG. 1.

As shown in FIG. 2, an application start process 200 provides application 118 with the necessary resources allocated in the grid computing environment 100 before executing on one or more computer devices (e.g., 12, 14, 16, 18, 20).

The process 200 includes the application 118 sending (202) requirements for computational resources to query one or more grid managers (e.g., 154) to determine if there are resources matching these requirements available in the grid computing environment 100. These requirements specify information pertaining to resources in a computer device such as required number of processors, required percentage of utilization for those processors, main memory, operating system, and network speed. The process 200 includes the one or more grid managers receiving (204) the requirements.

To respond to the query for available resources from the application 118, the process 200 includes the one or more grid managers matching (206) the requirements against resources known to the one or more grid managers. These resources can include resources (e.g., a processor) in computer device 14 that are directly managed by any single grid manager (e.g., 154).

If process 200 determines (210) that there is at least one resource meeting the application requirements (e.g., a processor on computer device 14), then a grid manager (e.g., 154) installs and starts (224) a software component (e.g., 122) on the resource. If the process 200 determines that there is not at least one resource meeting the application requirements, the process 200 determines (226) if an available resource can be configured to meet the requirements. If an available resource can be configured to meet the requirements, then the process 200 configures (228) the resource.

In some cases, the requirements are for a resource to run a particular operating system. For example, the resource requirements can include a resource running the Windows operating system. However, computer devices 12, 14, 16, 18, 20 run a version of the UNIX operating system, for example. Installing a particular operating system typically requires installation and rebooting of a computational device. Rebooting a computational device can be done if the computer device (e.g., 22) is managed by a computer management system (e.g., 24).

Computer device 22 is available as a resource for the grid computing environment 100. The grid manager 152 can utilize an application programmer's interface (API) 166 that is configured to issue commands to the computer management system 24. The grid manager 152 uses the API 166 to request that the computer manager system 24 install the required operating system with grid manager software on the computer device 22. The grid manager 152 also requests that the computer device 22 reboot (230). Upon initialization, the computer device 22 runs the required operating system and a grid manager 164. Subsequently, the grid manager 164 can install a new software component 128 on the computer device 22, the computer device 22 having the required operating system. The grid manager 164 then can start (224) the new software component 128 on the computer device 22.

The installation of the required operating system can be done using disk imaging. In disk imaging, an image in the form of a file is taken of a disk containing the required operating system with the grid manager software. Another installation technique includes Automated Deployment Services® (ADS) from Microsoft Corporation of Redmond, Wash. ADS supports the automatic and simultaneous installation of Windows operating system images to multiple servers that have no operating system installed.

The management system 24 receives the file with the disk image and writes the contents of the file into a disk drive that is readable by the computer device 22. The disk drive can reside with the computer device 22 or be a network attached storage (NAS) system on the same network as the computer device 22. Upon booting up, the computer device 22 reads the file in the disk drive and executes the instructions of the required operating system. The operating system image includes grid manager software with information that is required to enable the grid manager 164 to be part of the grid computing environment 100.

Figure 3:
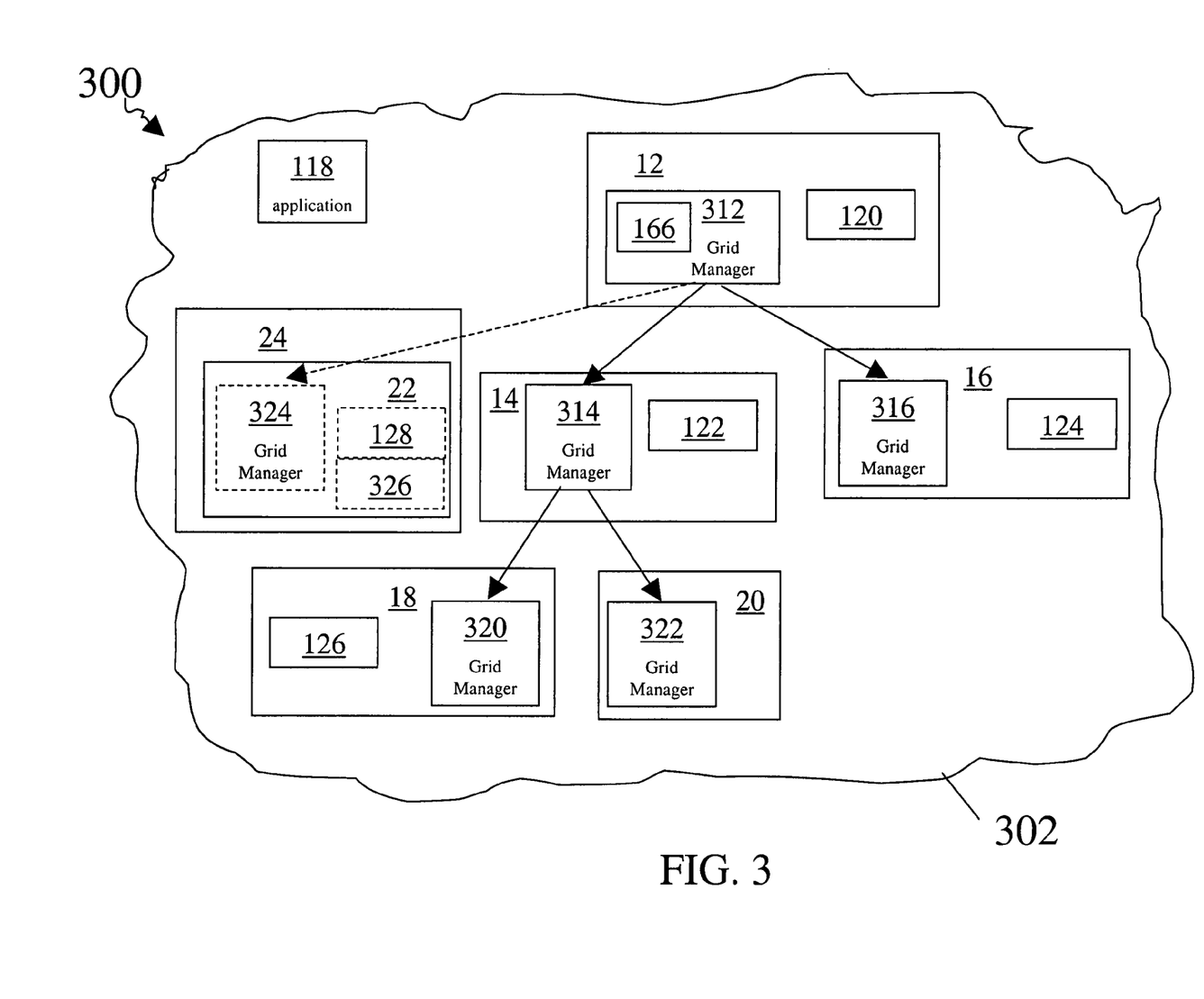
FIG. 3 is a block diagram of a grid computing environment having a hierarchical grid architecture.

As shown in FIG. 3, one example of the grid computing environment 100 is a grid computing environment 300 having a hierarchical grid management architecture. In the grid computing environment 300, grid managers 312, 314, 316, 320, 322 are organized according to this hierarchical grid management architecture. Within the grid computing environment 300, pairs of grid managers can have directional relations that classify one grid manager as superior (or inferior) to another grid manager. A grid manager can have more than one superior (or inferior) relations with other grid managers. For example, grid manager 312 has a superior relation with grid managers 314 and 316. A grid manager can also have more than one inferior relations with other grid managers. For example, through these hierarchical relations, the application 118 does not need access to a list of the computer devices 12, 14, 16, 18, 20, 22 in network 302 to use the computational resources in the grid computing environment 300. The application 118 only needs to have access to a network address of one computer device running a grid manager (e.g., computer device 12 running grid manager 312) and the grid manager 312 uses its relations with other grid managers running on other computer devices to provide the application 118 with access to other computer devices in the grid computing environment 300.

A grid manager (e.g., 312, 314, 316, 320, 322) maintains a first list of all superior relations with other grid managers and a second list of all inferior relations with other grid managers. These lists are maintained in a properties file for each grid manager. Each grid manager maintains an "always open" communications channel to all the grid managers in these lists over network 302 using, for example, interfaces on transmission control protocol (TCP), hypertext transfer protocol (HTTP), and simple object access protocol (SOAP). These communication channels are opened when the grid managers 312, 314, 316, 320, 322 are asynchronously started up on computer devices 12, 14, 16, 18, 20, respectively.

Figure 4:
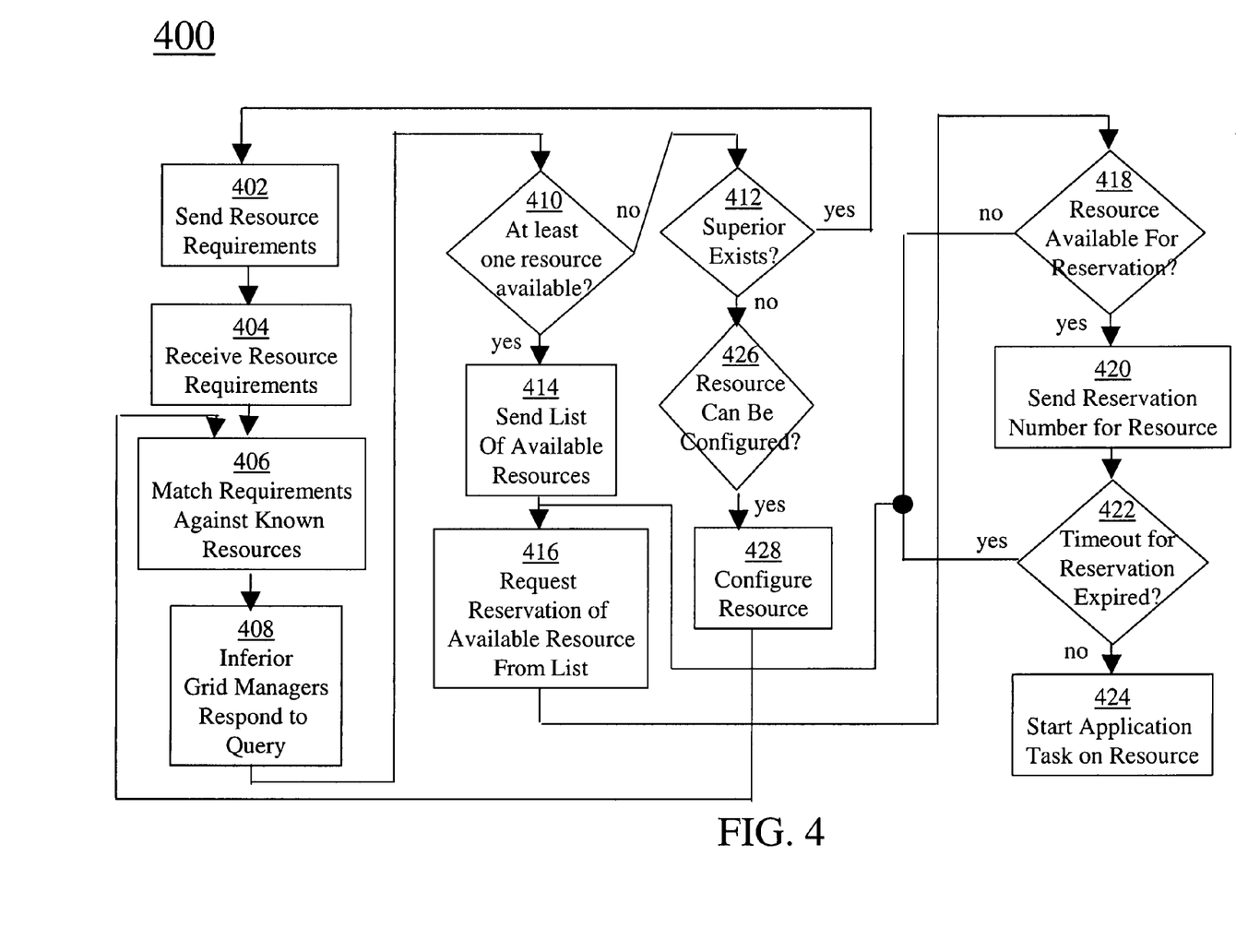
FIG. 4 is a flow diagram for discovering, configuring, and reserving resources in the grid computing environment of FIG. 3.

As shown in FIG. 4, an application start process 400 provides application 118 with the necessary resources allocated in the grid computing environment 300 before executing on one or more computer devices (e.g., 12, 14, 16, 18, 20).

The process 400 includes the application 118 sending (402) requirements for computational resources to query a grid manager (e.g., 314) to determine if there are resources matching these requirements available in the grid computing environment 300. These requirements specify information pertaining to resources in a computer device such as required number of processors, required percentage of utilization for those processors, main memory, operating system, and network speed. The query can also include information to which hierarchy level (in the grid computing environment 300) the query should be propagated. The process 400 includes the grid manager 314 receiving (404) the requirements.

To respond to the query for available resources from the application 118, the grid manager 314 matches (406) the requirements against resources known to the grid manager 314. These resources include resources (e.g., a processor) in computer device 14 that are directly managed by grid manager 314. Resources directly managed by the grid manager 314 that are currently available and meet the requirements are added to a resource-query list maintained by the grid manager 314.

Grid manager 314 also sends the query to grid managers 320 and 322 having inferior relations with grid manager 154. The process 400 includes grid managers 320 and 322 responding (408) to the query by sending to grid manager 154 lists of resources (e.g., processors on computer devices 18, 20) that meet the requested requirements and are available and known to grid managers 320 and 322, respectively. These resource-query lists of resources that are known to grid managers 320, 322 can also include resources managed by grid managers (not shown) with inferior relations to grid managers 320 and 322. The grid manager 314 adds these resource-query lists of available resources from grid managers 320 and 322 to its resource-query list of available resources meeting the requested requirements. If the process 400 determines (410) that there is at least one resource meeting the application requirements (e.g., a processor on computer device 14) in this resource-query list, then grid manager 314 sends (414) this resource-query list to the application 118. Otherwise, if the process 400 determines (412) that grid manager 314 has an inferior relation with a grid manager (e.g., grid manager 312), grid manager 314 sends (402) the query for available resources to grid manager 312. In response to this query, grid manager 312 does not send a redundant query back to grid manager 314 having an inferior relation with grid manager 312.

Process 400 includes grid manager 314 sending (414) the list of available resources along with addresses of their corresponding grid managers in the network 302 that match the requirements. The application 118 selects a resource (e.g., a processor on computer device 14) from the list and requests (416) a reservation of the resource on computer device 14 to the grid manager 314 managing the resource on computer device 14. If the resource in computer device 14 is still available for reservation (418) and the reservation succeeds, grid manager 314 sends (420) a reservation number to the application 118. This reservation means that the application 118 is guaranteed and allocated the requested resource on the computer device 14 in the grid computing environment 300. The grid manager 314 handles queries for available resources from applications using independent processing threads of execution. Thus, the grid manager 314 uses a semaphore to ensure that the same resource (e.g., the processor on the computer device 14) is not assigned multiple reservation numbers for different applications simultaneously requesting the same resource.

If the grid manager 314 determines that the requested resource in computer device 14 is not available for reservation and the reservation fails, the application 118 selects the next available resource in the list and requests (416) the reservation of this next available resource. If the application receives a registration number and a timeout measured from the sending of the registration number does not expire (422), the application 118 starts (424) the software component 122 on a processor resource in the computer device 14. Starting the software component 122 is initiated by the application 118 passing the reservation number and an application file to the grid manager 314 and then the grid manager 314 reads the application file to install and execute the software component 122 on the computer device 14.

If the process 400 determines (412) that the grid manager (e.g., 312) has no inferior relation with a grid manager, the process 400 determines (426) if an available resource can be configured to meet the requirements. If an available resource can be configured to meet the requirements, then the process 400 configures (428) the resource as previously described in process 200.

If the application 118 requesting the use of resources in the grid computing environment 100 requires one or more computational resources running a particular operating system and computer device 22 is available as a resource for the grid computing environment 300, the grid manager 312 uses the API 166 to install the particular operating system with grid manager software on the computer device 22 and command the computer device 22 to re-boot. Upon initialization, the computer device 22 runs a grid manager 324 with an inferior relation to the grid manager 312. Subsequently, the grid manager 312 matches (406) the requirements against known resources by sending the requirements for computational resources with the particular operating system to the grid manager 322 and the grid manager 322 responds (408) to the query by sending a list that includes a processor on the computer device 22. Subsequently, the grid manager 324 installs a software component 128 on the computer device 22, the computer device 22 having the required operating system.

The computer management system 24 receives the file with the disk image and writes the contents of the file into a hard drive associated with the computer device 22 or a networked disk drive or network attached storage (NAS) as described previously for grid computing environment 100. Upon starting up, the computer device 22 reads the file and executes the instructions of the required operating system. The operating system image includes grid manager software with a properties file 326 (described above) containing a list of grid managers having a superior relation to the grid manager 324 on computer device 22. This list includes grid manager 312.

Figure 5:
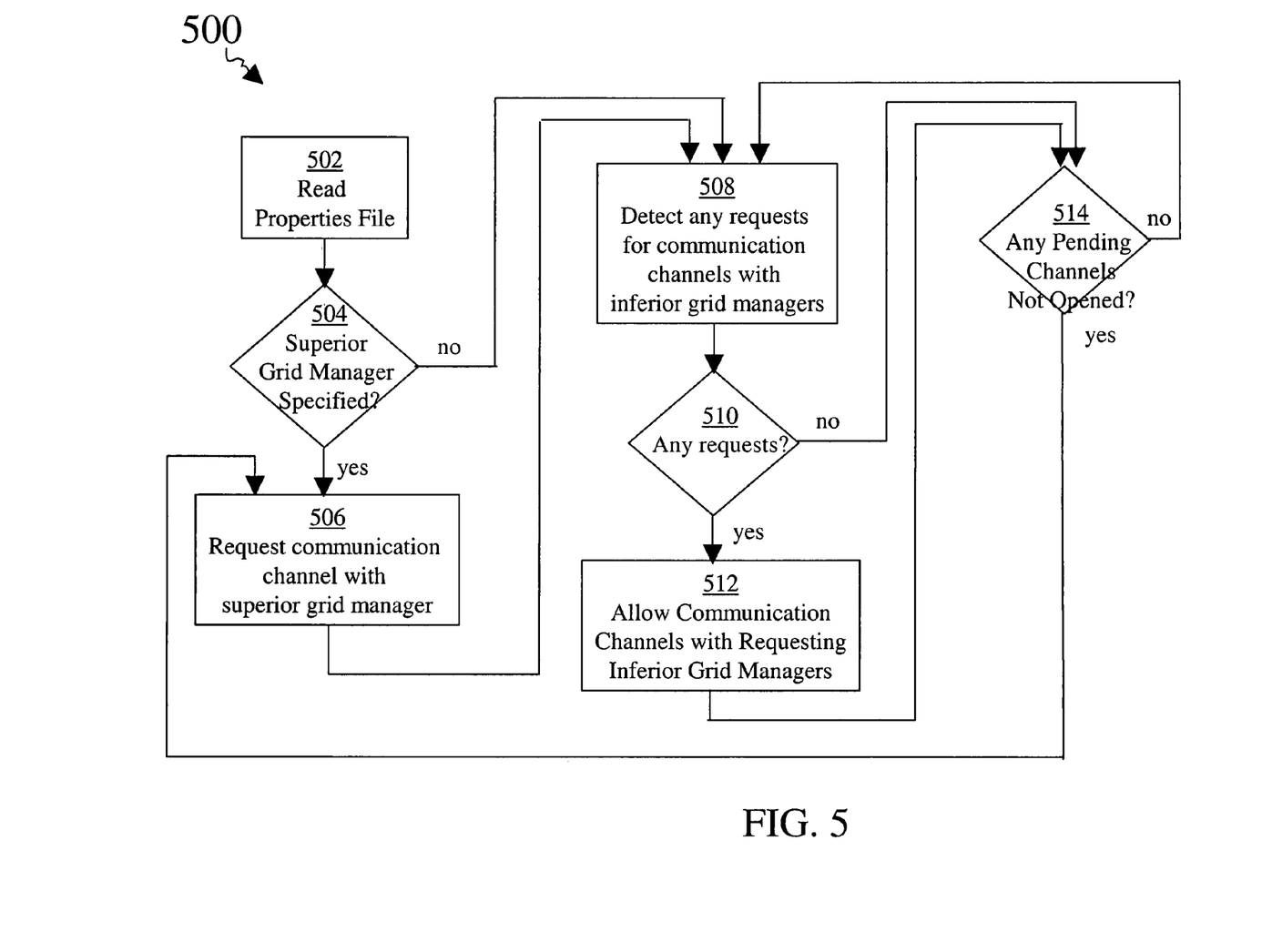
FIG. 5 is a flow diagram for starting up grid managers in the grid computing environment of FIG. 3.

As shown in FIG. 5, a process 500 initializes relations among grid managers in the grid computing environment 300. The process 500 is also used to initialize relations between the newly started grid manager 324 and other grid managers. The grid manager (e.g., 324) starts up on computer device 22 by reading (502) a properties file (e.g., 326). The properties file contains a list of addresses of computer devices with grid managers having superior relations to the grid manager. This list was described earlier as a first list of all superior relations with other grid managers. If the process 500 determines (504) that a superior grid manager (e.g., 312) is specified in this list of addresses, the grid manager 324 requests (506) to open a communication channel to the superior grid manager (e.g., 312). Process 500 includes the grid manager 312 detecting (508) any requests for communication channels from grid managers 324 that are identified as having inferior relations with the grid manager 312. If the process 300 determines (510) that there are some requests, the grid manager 312 allows communication channels from the inferior grid manager 324. The process 500 includes the grid manager 324 checking (514) if there are any pending requests for communication to grid managers 312 having superior relations. If there are any pending requests, the grid manager 324 requests (506) communication channels to these grid managers (e.g., 312). These communication channels are used for resource queries between grid managers (e.g., the process 400) as well as "heart beat" messages between grid managers to ensure that each grid manager in the grid computing environment 300 is functioning.

Other embodiments are within the scope of the following claims.

What is claimed is:

1. A method comprising:
in a grid network comprising a plurality of compute devices, each of the plurality of compute devices having a grid manager, determining available compute devices for installation and execution of an application, the application requiring a specific operating system;
in response to determining that there are no available compute devices having the specific operating system, sending a request to install the specific operating system and a grid manager on a compute device controlled by a management system through a link to the management system;
installing the specific operating system on the compute device controlled by the management system;
linking the compute device controlled by the management system to the grid network; and
installing the application on the compute device controlled by the management system,
wherein the grid managers manage the compute devices,
wherein the grid managers determine resources of the available compute devices, and
wherein the grid managers determine whether requirements of the application match the resources of the available compute devices known to the grid managers;
wherein the grid managers are classified as having a superior or inferior relationship with the other grid managers;
wherein a superior grid manager queries the other grid managers that have an inferior relationship to the superior grid manager, wherein, in response to the query, the grid managers that have an inferior relationship to the superior grid manager send a list of the resources of an available compute device that match the requirements of the application, wherein the superior grid manager does not act as an inferior grid manager.

2. The method of claim 1 further comprising executing the application in the compute device controlled by the management system.

3. The method of claim 1 in which the compute device controlled by the management system is a blade server and the management system is a blade management system.

4. The method of claim 1 in which sending includes using an application programming interface (API).

5. The method of claim 1 in which installing the specific operating system further comprises installing a grid manager on the compute device controlled by the management system.

6. The method of claim 1, wherein the grid managers reside in the compute devices.

7. The method of claim 1, wherein each of the plurality of compute devices has its own grid manager.

8. The method of claim 1, wherein each of the plurality of compute devices has a different grid manager.

9. A computer program product tangibly embodied in a computer-readable storage medium, for deploying an application, the computer program product being operable to cause a data processing apparatus to:
in a grid network comprising a plurality of compute devices, each of the plurality of compute device having a grid manager, determine available compute devices for installation and execution of the application, the application requiring a specific operating system platform;
in response to determining that there are no available compute devices having the specific operating system platform, send a request to install the specific operating system and a grid manager on a compute device controlled by a management system through a link to the management system;
install the specific operating system on the compute device controlled by the management system; and
link the compute device controlled by the management system to the grid network
wherein the grid managers manage the compute devices,
wherein the grid managers determine resources of the available compute devices, and
wherein the grid managers determine whether requirements of the application match the resources of the available compute devices known to the grid managers;
wherein the grid managers are classified as having a superior or inferior relationship with the other grid managers;
wherein a superior grid manager queries the other grid managers that have an inferior relationship to the superior grid manager, wherein, in response to the query, the grid managers that have an inferior relationship to the superior grid manager send a list of the resources of an available compute device that match the requirements of the application, wherein the superior grid manager does not act as an inferior grid manager.

10. The product of claim 9, the computer program product being operable to further cause a data processing apparatus to execute the application in the compute device controlled by the management system.

11. The product of claim 9 in which the compute device controlled by the management system is a blade server and the management system is a blade management system.

12. product of claim 9, the product being further operable to cause the data processing apparatus to use an application programming interface (API) to send the request.

13. The product of claim 9, the product being further operable to cause the data processing apparatus to install a grid manager on the compute device controlled by the management system.

14. A system comprising:
a client system residing in a grid network of interconnected grid compute devices, each of the interconnected grid compute devices having a grid manager;
means for receiving a request in the client system to deploy and execute an application, the application requiring a specific operating system, the specific operating system unavailable in the interconnected grid compute devices;
means for sending a request to install the specific operating system and a grid manager on a compute device controlled by a management system through a link to the management system;
means for installing the specific operating system on the compute device controlled by the management system;
means for installing the grid manager on the compute device controlled by the management system;
means for linking the compute device controlled by the management system to the grid network; and
means for installing the application on the compute device controlled by the management system
wherein the grid managers manage the compute devices,
wherein the grid managers determine resources of the available compute devices, and
wherein the grid managers determine whether requirements of the application match the resources of the available compute devices known to the grid managers;
wherein the grid managers are classified as having a superior or inferior relationship with the other grid managers;
wherein a superior grid manager queries the other grid managers that have an inferior relationship to the superior grid manager, wherein, in response to the query, the grid managers that have an inferior relationship to the superior grid manager send a list of the resources of an available compute device that match the requirements of the application, wherein the superior grid manager does not act as an inferior grid manager.

15. The system of claim 14 further comprising means for executing the application in the compute device controlled by the management system.

16. system of claim 14 in which the means for sending use an application programming interface (API).

17. The method of claim 14 in which the compute device controlled by the management system is a blade server and the management system is a blade management system.

* * * * *